US009120938B2

(12) United States Patent
Carlson et al.

(10) Patent No.: US 9,120,938 B2
(45) Date of Patent: Sep. 1, 2015

(54) POLYMERIZABLE ORGANOBORON ALKYD RESIN ANTI FOULING COATINGS

(71) Applicant: Empire Technology Development LLC, Wilmington, DE (US)

(72) Inventors: William Brenden Carlson, Seattle, WA (US); Gregory David Phelan, Cortland, NY (US)

(73) Assignee: Empire Technology Development LLC, Wilmington, DE (US)

( * ) Notice: Subject to any disclaimer, the term of this patent is extended or adjusted under 35 U.S.C. 154(b) by 112 days.

(21) Appl. No.: 13/950,851

(22) Filed: Jul. 25, 2013

(65) Prior Publication Data

US 2014/0037572 A1     Feb. 6, 2014

(51) Int. Cl.
*C07F 5/02*     (2006.01)
*C09D 5/16*     (2006.01)

(52) U.S. Cl.
CPC .................................. *C09D 5/1637* (2013.01)

(58) Field of Classification Search
USPC ..................................... 554/77, 84; 526/239
See application file for complete search history.

(56) References Cited

U.S. PATENT DOCUMENTS

| | | | |
|---|---|---|---|
| 3,852,314 | A | 12/1974 | Hamanaka et al. |
| 4,515,724 | A | 5/1985 | Ritter |
| 4,778,833 | A | 10/1988 | Van Der Drift et al. |
| 4,985,305 | A * | 1/1991 | Schubart et al. ............... 428/389 |
| 6,291,549 | B1 | 9/2001 | Mechtel et al. |
| 6,365,066 | B1 | 4/2002 | Podszun et al. |
| 6,462,102 | B1 | 10/2002 | Yamamori et al. |
| 6,521,694 | B2 | 2/2003 | Belt et al. |
| 6,705,926 | B2 | 3/2004 | Zhou et al. |
| 6,713,523 | B2 | 3/2004 | Nagata et al. |
| 6,753,397 | B2 | 6/2004 | Nakamura et al. |
| 6,958,366 | B2 | 10/2005 | Tokunaga et al. |
| 7,049,304 | B2 | 5/2006 | Holmes-Farley et al. |
| 2005/0013939 | A1 | 1/2005 | Vinden et al. |
| 2007/0056655 | A1* | 3/2007 | Vinden .......................... 144/380 |
| 2010/0104629 | A1 | 4/2010 | Dande et al. |
| 2010/0190884 | A1 | 7/2010 | Gillard et al. |
| 2010/0222452 | A1 | 9/2010 | Kawahara |
| 2012/0083433 | A1 | 4/2012 | Heise et al. |

FOREIGN PATENT DOCUMENTS

| | | |
|---|---|---|
| EP | 0286265 | 3/1988 |
| EP | 2006336 | 12/2008 |
| GB | 0901567 | 7/1962 |
| JP | 4172456 | 6/1992 |
| JP | 2001-262044 | 9/2001 |
| WO | WO-2009/129395 | 1/2009 |
| WO | WO-2010/048536 | 1/2010 |
| WO | WO-2010/054384 | 1/2010 |
| WO | WO-2010/054406 | 1/2010 |

OTHER PUBLICATIONS

Lesar, B., et al., "Use of boron compounds for treatment of wooden historical objects," COST Action IE0601 Wood Science for Conservation of Cultural Heritage International Conference on Wooden Cultural Heritage: Evaluation of Deterioration and Management of Change, pp. 1-5 (Oct. 7-10, 2009).
Blue Water Marine Paint, downloaded on Jul. 22, 2013 from http://www.bluewatermarinepaint.com/marinealkyd50.html.
Brown, H.C., et al., "Organoboranes. 39. Convenient Procedures for the Preparation of Methylboronic Acid and Trimethylboroxin," *Organometallics*, 1985, vol. 4, pp. 816-821.
Gerrard, W., et al., "The Chemistry of Certain Acyloxygboron Compounds and Boron Chelates," *Journal of Chemical Society*, 1958, pp. 3648-3652.
Goto, M., "Chemical recyling of plastics using sub-, supercritical fluids," *The Journal of Supercritical Fluids, 2008*, copy of Accepted Manuscript attached, doi:10.1016/j.supflu.2008.10.011, 30 pp.
Goubeau, J. et al., "Acetic acid derivatives of methylboric acids," *Journal of Heterocyclic Chemistry*, Jun. 1963, vol. 322, Nos. 5-6, pp. 224-238. abstract considered.
Grainger Rust-Oleum Marine Alkyd Coating Product, 2 pp.; downloaded on Jul. 16, 2013 from http://www.grainger.com/Grainger/RUSTOLEUM-Marine-Coating-2GXC7?cm_mmc=CSE:GoogleBase-_Painting-_-Paints-_-2GXC7&ci_src=14110944&ci_sku=2GXC7.
International Search Report and Written Opinion for PCT/US2012/048981, mailed on Dec. 19, 2012, 12 pp.
Kartal, S. N., et al., "Laboratory evaluation of boron-containing quaternary ammonia compound, didecyl dimethyl ammonium tetrafluoroborate (DBF) for inhibition of mold and stain fungi," *Holz als Roh- und Werkstof*, 2005, vol. 63, pp. 73-77.
Kartal, S.N., et al., "Laboratory evaluation of boron-containing quaternary ammonia compound, didecyl dimethyl ammonium tetrafluoroborate (DBF) for control of decay and termite attack and fungal staining of wood," *Holz als Roh- und Werkstoff*, 2006, vol. 64, pp. 62-67.
Kolesnikov, G.S., et al., Reactions of Mono- and Di-Carboxylic Acids With Trialkylborines and Trialkylaluminums, Institute of Heteroorganic Compounds, Academy of Sciences, USSR, May, 1962, pp. 841-844.
Sherwin_Williams Silicone Alkyd product, 3 pp., downloaded on Jul. 16, 2013 from http://protective.sherwin-williams.com/detail.jsp?a=sku-26483%3aproduct-6935.
Sherwin-Williams search results for waterbased and solvent based alkyd coatings and primers, 5 pp., downloaded on Jul. 16, 2013 from http://protective.sherwin-williams.com/coatings/categories/template.jsp?N=13.
Thevenon, M.F., et al., "High performance tannin resin-boron wood preservatives for outdoor end-users," *European Journal of Wood and Wood Products*, 2009, vol. 67, No. 1, pp. 89-93.
West Marine Pettit Marine Enamel Paints, 2 pp., downloaded on Jul. 16, 2013 from http://www.westmarine.com/webapp/wcs/stores/servlet/Product_11151_10001_93374_-1?ci_src=171083619&ci_sku=93374&cid=cj&AID=10540053&PID=3822428&cid=cj.

* cited by examiner

*Primary Examiner* — Sudhakar Katakam
*Assistant Examiner* — Pancham Bakshi
(74) *Attorney, Agent, or Firm* — Foley & Lardner LLP

(57) ABSTRACT

A compound includes a boron atom attached to at least one $C_8$-$C_{26}$ fatty acid residue having at least one C=C moiety. Such compounds are polymerizable through the at least one C=C moiety. Polymers thus formed exhibit anti-fouling properties when used as coatings.

19 Claims, No Drawings

POLYMERIZABLE ORGANOBORON ALKYD RESIN ANTI FOULING COATINGS

CROSS-REFERENCE TO RELATED APPLICATIONS

This application claims the benefit of International Application Serial No. PCT/US2012/048981, filed on Jul. 31, 2012, the entire disclosure of which is hereby incorporated by reference for all purposes in its entirety as if fully set forth herein.

FIELD

The present technology relates to polymerizable organoboron compounds and their use as anti-fouling coatings. More specifically, the technology is directed to fatty acid derivatives of boron, the synthesis of fatty acid boron compounds and anti-fouling coatings containing polymerized fatty acid boron compounds.

BACKGROUND

The following description is provided to assist the understanding of the reader. None of the information provided or references cited is admitted to be prior art to the present technology.

The Earth's oceans serve as highways for transporting goods, for the passage of recreational shipping vessels, and for the transport of troops and ammunition necessary for national defense purposes. Ships used for such transport are constantly exposed to harsh, corrosive conditions due to the salinity of sea water and are also exposed to rot and deterioration from biological life forms present in the oceans.

The economic loss to the shipping industry due to corrosion and deterioration of ships sailing the oceans is large. To reduce the economic impact, shipping vessels are protected through the use of antifouling coatings that serve three basic functions. First, the coatings protect the vessel hulls from the corrosive effects of salt water. Second, the coatings can also serve as a decorative and/or color film that permits ease of identification of an ocean liner. Finally, the coatings prevent aquatic life, i.e. biofilms and barnacles, from growing on the hull, which unabated cause drag on the ship and increased fuel consumption. For example, biofilms may increase the drag by 20%, and the growth of barnacles may increase drag by over 60%, when compared to a pristine ship without biological growth. Without removal of the growth of the films or other life forms, such increases in drag can only be overcome by higher fuel consumption for the ships.

While commercially available coatings attempt to address the problem of preventing or minimizing the growth of biofilm and aquatic lifeforms on hulls, the coatings tend to contain environmentally unfriendly chemical compounds that leach off into the ocean and upset the delicate balance of life within the oceans. For instance, many of the presently available coatings contain organotin or organocopper compounds that can have a marked negative impact on the environment.

SUMMARY

The present technology provides an alternative anti-fouling coating material that is environmentally friendly, easy to manufacture, and is effective at reducing and/or eliminating the presence of biological material from ship hulls.

In one aspect, a compound includes a boron atom attached to at least one $C_8$-$C_{26}$ fatty acid residue having at least one C=C moiety. In some embodiments, the boron atom is attached to at least two $C_8$-$C_{26}$ fatty acid residues. In some embodiments, the residue has at least two C=C moieties. In some embodiments, the compound is represented by Formula I, II or III:

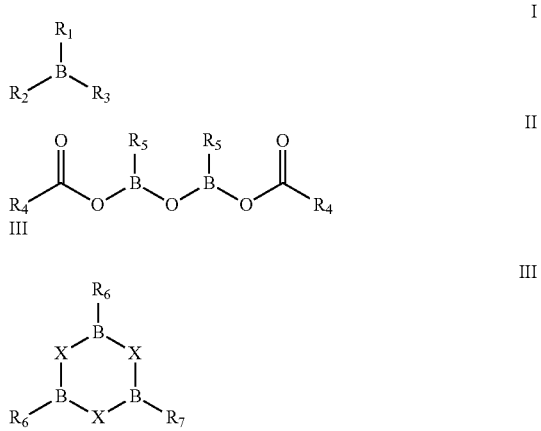

In the compounds of Formula I, II, and III, $R_1$ and $R_2$ are independently a group represented by Formula IV:

$$-E(CH_2)_n(CH=CH)_{n'}(CH_2)_x(CH=CH)_{x'}(CH_2)_zCH_3 \quad (IV)$$

E is —OC(O)—, O, or $CH_2$; $R_3$, each $R_5$, and $R_7$ are independently $NR_8R_9$ or a group represented by Formula IV; $R^4$ is a group represented by Formula V:

$$-(CH_2)_n(CH=CH)_{n'}(CH_2)_x(CH=CH)_{x'}(CH_2)_zCH_3 \quad (V);$$

each $R_6$ is a group represented by Formula IV or Formula V; $R_8$ is H or alkyl; $R_9$ is H or alkyl; n is an integer from 0 to 16; n' is 0, 1, or 2; x is an integer from 0 to 10; x' is an integer 0, 1, or 2; and z is an integer from 0 to 16. However, the compounds are subject to the proviso that n' and x' are not both 0; and the sum of (n+2n'+x+2x'+z) is from 6 to 24.

In some of the above embodiments, the n' and x' are both greater than 0. In other embodiments, x may be 0 or 1. In other embodiments, the sum of: n+2n'+x+2x'+z is from 14 to 24. In some embodiments, z is an integer from 1 to 7. In some embodiments, n is an integer from 1 to 16. In some embodiments, E is $CH_2$. In some embodiments, E is O. In some embodiments, E is —OC(O).

In some of the above embodiments, the compound is represented by Formula I, and $R_1$ and $R_2$ are the same, $R_3$ is $NR_8R_9$, $R_8$ is $C_2$-$C_4$ alkyl, and $R_9$ is $C_2$-$C_4$ alkyl. In some embodiments, the compound is represented by Formula I, and $R_1$, $R_2$, and $R_3$ are the same. In any of the above embodiments, the group represented by Formula IV may include a carbon chain designated as 16:3 (n–3); 18:1 (n–9); 18:2 (n–6); 18:2 (n–6); 18:2 (n–7); 18:3 (n–3); 18:3 (n–3); 18:3 (n–5); 18:3 (n–5); 18:3 (n–5); 18:3 (n–5); 18:3 (n–6); 18:3 (n–6); 18:3 (n–6); 18:3 (n–6); 18:3 (n–6); 18:4 (n–3); 18:4 (n–3); 18:4 (n–3); 20:1 (n–9); 20:2 (n–6); 20:3 (n–3); 20:3 (n–6); 20:3 (n–6); 20:3 (n–9); 20:4 (n–3); 20:4 (n–6); 20:5 (n–3); 20:5 (n–6); 21:5 (n–3); 22:1 (n–9); 22:2 (n–6); 22:4 (n–6); 22:5 (n–3); 22:5 (n–6); 22:6 (n–3); 24:1 (n–9); 24:4 (n–6); 24:5 (n–3); 24:5 (n–6); or 24:6 (n–3), wherein the number before the colon is the total number of carbon atoms in the group, the number after the colon is the number of unsaturations in the group, and the number in parentheses is the carbon number from a terminal carbon at which the first unsaturation is located, with each unsaturation being separated from the next by a single methylene group.

In another aspect, a polymer is provided including a polymerization product of any of the above compounds.

In another aspect, a coating composition includes any of the above compounds or any of the above polymers, a dispersant, and a medium. The medium may be an aqueous medium and the compound or polymer of the compound is present as an emulsion. Alternatively, the medium used to manufacture a coating composition may be an organic solvent medium. In any of the above coating compositions, the dispersant may include surfactants. Surfactants may be included to aid in the formation of emulsion coatings. Within the context of the present technology, the term "surfactant" refers to a compound that lowers the surface tension at the interface between two liquids or a liquid and a solid. The surfactant used may be ionic in nature or non-ionic. Ionic surfactants can be positively charged or negatively charged. Examples of surfactants used to aid and stabilize emulsion coatings include, but are not limited to, sodium dodecylsulfonate, cetyltrimethylammonium bromide, or polyethylene glycol p-(1,1,3,3-tetramethylbutyl)-phenyl ether. Any of the above coating compositions may further include a pigment. Illustrative pigments may include, but are by no means limited to, purple pigments, blue pigments, green pigments, yellow pigments, orange pigments, red pigments, brown pigments, black pigments and white pigments. Any of the above coating compositions may be a paint.

In another aspect, an article is provided including any of the above the coating compositions.

In another aspect, a process is provided for preparing a compound having a moiety represented by Formula VI:

$$B-(R_{12}) \qquad \text{VI}$$

The process includes contacting a compound represented by Formula VII with a compound having a B-halogen moiety:

$$ME(CH_2)_n(CH=CH)_{n'}(CH_2)_x(CH=CH)_{x'}(CH_2)_zCH_3 \qquad \text{(VII)}.$$

In such processes, $R_{12}$ is a group represented by Formula IV:

$$-E(CH_2)_n(CH=CH)_{n'}(CH_2)_x(CH=CH)_{x'}(CH_2)_zCH_3 \qquad \text{(IV)}$$

E is —OC(O)—, O, or $CH_2$; M is an alkali or alkaline earth metal halide; n is from 0 to 16; n' is 0, 1, or 2; x is from 0 to 10; x' is 0, 1, or 2; and z is from 0 to 16; provided that: n' and x' are not both 0; and the sum of n+2n'+x+2x'+z is from 6 to 24. In the processes M may be Li, Na, K, MgF, MgBr, or MgCl. In some embodiments, the B-halogen moiety is a compound represented by Formula IX:

$$BX_2(NR_8R_9) \qquad \text{VIII}$$

wherein X is F, Cl, or Br; $R_8$ is H or alkyl; and $R_9$ is H or alkyl.

In another aspect, a process is provided for preparing a compound having a moiety represented by Formula IX:

$$B-(R_{13}) \qquad \text{IX}$$

The process includes contacting a compound represented by Formula X with a compound having a B-halogen moiety:

$$HO(CH_2)_n(CH=CH)_{n'}(CH_2)_x(CH=CH)_{x'}(CH_2)_zCH_3 \qquad \text{(X):}$$

wherein $R_{13}$ is a group represented by Formula XI:

$$-O(CH_2)_n(CH=CH)_{n'}(CH_2)_x(CH=CH)_{x'}(CH_2)_zCH_3 \qquad \text{(XI)}$$

n is from 0 to 16; n' is 0, 1, or 2; x is from 0 to 10; x' is 0, 1, or 2; and z is from 0 to 16; provided that: n' and x' are not both 0; and the sum of: n+2n'+x+2x'+z is from 6 to 24. The process may be conducted in the presence of a base. In some embodiments, the compound having a B-halogen moiety is a compound represented by Formula XII:

$$BCl_2(NR_8R_9) \qquad \text{XII}$$

where $R_8$ is H or alkyl; and $R_9$ is H or alkyl.

In another aspect, a process of coating an article is provided including applying a compound to the article, wherein the compound includes a boron atom attached to at least one $C_8$-$C_{26}$ fatty acid residue having at least one C=C moiety.

In another aspect, a process of preparing a polymer of any of the above compounds is provided. The process includes dispersing the compound in water and optionally adding an initiator, or a drier compound, to form a polymerization mixture. Exposing the polymerization mixture under agitation to air, oxygen, or peroxide polymerize the C=C moieties and form an emulsion of the polymer of the compound.

In another aspect, a process of preparing a polymer of any of the above compounds is provided that includes the use of drier compounds. Examples of such compounds include metal ions such as cobalt, iron cerium, manganese vanadium, lead, zirconium, bismuth, barium, aluminum strontium, calcium, zinc, lithium or potassium The foregoing summary is illustrative only and is not intended to be in any way limiting. In addition to the illustrative aspects, embodiments and features described above, further aspects, embodiments and features will become apparent by reference to the following detailed description.

DETAILED DESCRIPTION

The illustrative embodiments described in the detailed description and claims are not meant to be limiting. Other embodiments may be utilized, and other changes may be made, without departing from the spirit or scope of the subject matter presented here.

The present technology is described herein using several definitions, as set forth throughout the specification.

As used herein, unless otherwise stated, the singular forms "a," "an," and "the" include plural reference. Thus, for example, a reference to "a cell" includes a plurality of cells, and a reference to "a molecule" is a reference to one or more molecules.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

Alkyl groups include straight chain, branched chain, or cyclic alkyl groups having 1 to 24 carbons or the number of carbons indicated herein. In some embodiments, an alkyl group has from 1 to 16 carbon atoms, from 1 to 12 carbons, from 1 to 8 carbons or, in some embodiments, from 1 to 6, or 1, 2, 3, 4 or 5 carbon atoms. Examples of straight chain alkyl groups include groups such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. In some embodiments, the alkyl groups may be substituted alkyl groups.

Cycloalkyl groups are cyclic alkyl groups having from 3 to 10 carbon atoms. In some embodiments, the cycloalkyl group has 3 to 7 ring members, whereas in other embodiments the number of ring carbon atoms range from 3 to 5, 3 to 6, or 5, 6 or 7. Cycloalkyl groups further include monocyclic, bicyclic and polycyclic ring systems. Monocyclic groups include, e.g., cyclopropyl, cyclobutyl, cyclopentyl, cyclohexyl, and cycloheptyl groups. Bicyclic and polycyclic cycloalkyl groups include bridged or fused rings, such as, but not limited to, bicyclo[3.2.1]octane, decalinyl, and the like. Cycloalkyl groups include rings that are substituted with straight or branched chain alkyl groups as defined above. In some embodiments, the cycloalkyl groups are substituted cycloalkyl groups. Representative substituted alkenyl groups may be mono-substituted or substituted more than once, such as, but not limited to, mono-, di- or tri-substituted with substituents such as those listed above. Representative substituted alkyl groups may be mono-substituted or substituted more than once, such as, but not limited to, mono-, di- or tri-substituted with substituents such as those listed above.

Alkenyl groups include straight and branched chain alkyl groups as defined above, except that at least one double bond exists between two carbon atoms. Thus, alkenyl groups have from 2 to 24 carbon atoms, and typically from 2 to 10 carbons or, in some embodiments, from 2 to 8, 2 to 6, or 2 to 4 carbon atoms. Examples include, but are not limited to vinyl, allyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, among others. Representative substituted alkenyl groups may be mono-substituted or substituted more than once, such as, but not limited to, mono-, di- or tri-substituted with substituents such as those listed above.

Aryl groups are cyclic aromatic hydrocarbons that do not contain heteroatoms. Thus aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, and naphthenyl groups. Although the phrase "aryl groups" includes groups containing fused rings, such as fused aromatic-aliphatic ring systems (e.g., indanyl, tetrahydronaphthyl, and the like), it does not include aryl groups that have other groups, such as alkyl or halo groups, bonded to one of the ring members. Rather, groups such as tolyl are referred to as substituted aryl groups. Representative substituted aryl groups may be mono-substituted or substituted more than once, such as, but not limited to, 2-, 3-, 4-, 5-, or 6-substituted phenyl or naphthyl groups, which may be substituted with groups including, but not limited to, amino, alkoxy, alkyl, cyano, and/or halo. In some embodiments, aryl is phenyl or naphthyl. In certain embodiments, aryl is phenyl.

Heteroaryl groups include an aromatic ring containing, for example, 5 to 12, or 5 to 10 atoms including one or more heteroatoms (e.g., 1, 2, 3 or 4 heteroatoms) selected from N, O and S and with the remaining ring atoms being carbon. Heteroaryl groups do not contain adjacent S and O atoms. Unless otherwise indicated, heteroaryl groups may be bound to the parent structure by a carbon or nitrogen atom, as valency permits. For example, "pyridyl" includes 2-pyridyl, 3-pyridyl and 4-pyridyl groups, and "pyrrolyl" includes 1-pyrrolyl, 2-pyrrolyl and 3-pyrrolyl groups. Heteroaryl groups may be monocyclic or polycyclic (e.g., bicyclic, tricyclic). In some embodiments, a heteroaryl group is monocyclic. Examples include pyrrole, pyrazole, imidazole, triazole (e.g., 1,2,3-triazole, 1,2,4-triazole, 1,2,4-triazole), tetrazole, furan, isoxazole, oxazole, oxadiazole (e.g., 1,2,3-oxadiazole, 1,2,4-oxadiazole, 1,3,4-oxadiazole), thiophene, isothiazole, thiazole, thiadiazole (e.g., 1,2,3-thiadiazole, 1,2,4-thiadiazole, 1,3,4-thiadiazole), pyridine, pyridazine, pyrimidine, pyrazine, triazine (e.g., 1,2,4-triazine, 1,3,5-triazine) and tetrazine. In some embodiments, more than one ring of a polycyclic heteroaryl group are aromatic. Examples include indole, isoindole, indazole, benzoimidazole, benzotriazole, benzofuran, and benzoxazole.

The terms "alkylene," "alkenylene," and "arylene," alone or as part of another substituent, means a divalent radical derived from an alkyl, cycloalkyl, alkenyl, aryl, or heteroaryl group, respectively, as exemplified by —CH$_2$CH$_2$CH$_2$CH$_2$—. For alkylene, alkenyl, or aryl linking groups, no orientation of the linking group is implied.

The term "amine" (or "amino") as used herein refers to —NHR and —NRR' groups, where R, and R' are independently hydrogen, or a substituted or unsubstituted alkyl, alkenyl, alkynyl, cycloalkyl, aryl or aralkyl group as defined herein. Examples of amino groups include —NH$_2$, methylamino, dimethylamino, ethylamino, diethylamino, propylamino, isopropylamino, phenylamino, benzylamino, and the like.

The term "oxo" refers to a divalent oxygen group. While the term includes doubly bonded oxygen, such as that found in a carbonyl group, as used herein, the term oxo explicitly includes singly bonded oxygen of the form —O— which is part of a polymer backbone. Thus, an oxo group may be part of an ether linkage (—O—), an ester linkage (—O—C(O)—), a carbonate linkage (—O—C(O)O—), a carbamate linkage (—O—C(O)NH— or —O—C(O)NR—), and the like.

"Substituted" refers to a chemical group as described herein that further includes one or more substituents, such as lower alkyl (including substituted lower alkyl such as haloalkyl, hydroxyalkyl, aminoalkyl), aryl (including substituted aryl), acyl, halogen, hydroxy, amino, alkoxy, alkylamino, acylamino, thioamido, acyloxy, aryloxy, aryloxyalkyl, carboxy, thiol, sulfide, sulfonyl, oxo, both saturated and unsaturated cyclic hydrocarbons (e.g., cycloalkyl, cycloalkenyl), cycloheteroalkyls and the like. These groups may be attached to any carbon or substituent of the alkyl, alkenyl, alkynyl, aryl, cycloheteroalkyl, alkylene, alkenylene, alkynylene, arylene, hetero moieties. Additionally, the substituents may be pendent from, or integral to, the carbon chain itself.

In one aspect, organoboron compounds are provided as anti-fouling agents which are more environmentally friendly than their organotin or organocopper counterparts currently in use. More specifically, the present technology provides fatty acid analogs of boron, such as boron compounds having one or more unsaturated fatty acid groups that are based upon omega-3 drying oils. These fatty acid boron compounds are polymerizable and can reduce biomass accumulation by preventing the formation of biofilms and growth of aquatic life forms on ship hulls.

In the context of the present technology, the term "fatty acid" refers to a straight chain hydrocarbons possessing a carboxylic acid group at one end. The hydrocarbon or alkyl tail of fatty acids can have from about eight ($C_8$) to about twenty-six ($C_{26}$) carbon atoms. There are two classes of fatty acids. Saturated fatty acids are compounds that do not contain a carbon-carbon double bond in the alkyl tail. Unsaturated fatty acids contain at least one carbon-carbon double bond that can be in a cis- or trans-configuration.

Cis-fatty acids are compounds in which the two hydrogen atoms attached to the double bonded carbon atoms are on the same side of the carbon-carbon double bond.

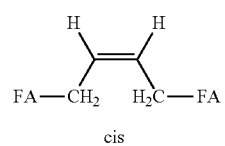

cis

The trans-configuration, in contrast, is obtained when the two hydrogen atoms attached to the double bonded carbon atoms are on opposite sides the carbon-carbon double bond.

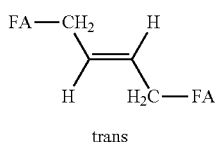

trans

Since biological fatty acids can be of different lengths, chemical nomenclature denotes the last position, that is the last carbon atom of the fatty acid tail as an omega ("ω") carbon. Moreover, because physiological properties of unsaturated fatty acids largely depend on the position of the first unsaturation relative to the last (end) carbon atom and not relative to the carboxylate, the position of unsaturation in a fatty acid tail is denoted as "ω–n" (ω minus n). For example, the term ω–3 signifies that the first double bond exists at the third carbon from the terminal $CH_3$ (ω) group of the carbon chain. The number of carbons and the number of double bonds are also listed in the fatty acids name. For instance, ω–3 18:4 (stearidonic acid) or 18:4 ω–3 or 18:4 n–3 indicates an 18-carbon chain with 4 double bonds, and with the first double bond in the third position from the $CH_3$ end.

Unsaturated fatty acids suitable for the manufacture of organoboron compounds according to the present technology are illustrated by the structure shown below.

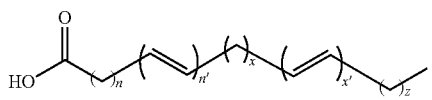

According to one embodiment, the unsaturated fatty acid can possess two or more double bonds. Depending on the numerical values for each subscript n, n', x, x' and z, two or more double bonds within the fatty acid tail can be conjugation to each other or the two carbon-carbon double bonds are separated from each other by one or more intervening methylene ($-CH_2-$) groups. Examples of mono-, di- and tri-unsubstituted fatty acids include without limitation myristoleic acid, palmitoleic acid, oleic acid, linoleic acid, linolenic acid, eleosteraic acid and eicosapentaenoic acid as well as the unsaturated fatty acids illustrated below in Table 1.

Fatty acid organoboron compounds (alkyds), are high boiling liquids that, according to one illustrative embodiment, may be formulated as a separate coating for ship hulls or may be incorporated into a paint for use on a ship's hull. The unsaturated fatty acid groups used in the manufacture of these compounds are generally oils that are obtained from linseed, safflower, sunflower and soybeans. Other sources of unsaturated fatty acids suitable for the manufacture of organoboron compounds include those found in Tung oil, and Tall oil.

Within the context of the present technology, an "alkyd" refers to a polyester modified by the addition of fatty acids. Alkyds are obtained by the condensation of a polyol with a carboxylic acid or a carboxylic acid anhydride. The inclusion of the fatty acid confers a tendency to form flexible coating. Alkyds are used extensively, therefore, in paints and coatings.

The present technology is directed to polymerizable organoboron compounds that contain a boron atom having one or more unsaturated fatty acid substituent groups. It is possible to fine-tune the physicochemical nature of the organoboron polymer by modulating the length and degree of unsaturation of the fatty acid used as a substituent group. Thus, the present technology provides organoboron compounds and their polymers as antifouling agents that have unexpected and advantageous properties over many commercially used anti-fouling agents. For instance, organoboron compounds according to the present technology and their polymers have superior inhibitory activity against the accumulation of biomass, possess increased bonding with substrates, such as the hull of a ships hull and are environmentally benign. These compounds can readily be formulated into high gloss coatings which polymerize to a solid resin with little or no leaching of the boron compounds to the surrounding aqueous environment. Since the organoboron compounds are manufactured using naturally occurring unsaturated fatty acids their degradative products are non-toxic and environmentally benign.

In one aspect, polymerizable, organoboron compounds are provided according to Formulae I, II or III.

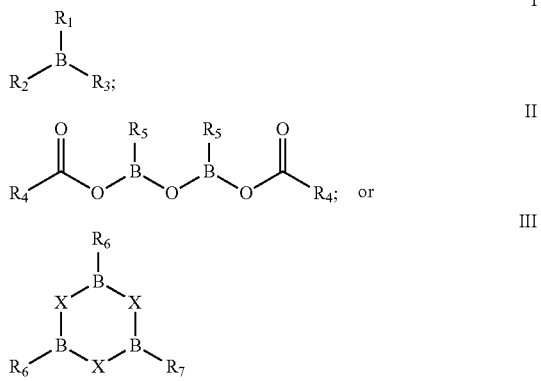

Compounds according to Formulae I-III have a boron atom to which is covalently bonded one or more substituent groups. For instance, the boron compounds have one, two or three unsaturated, $C_8$-$C_{26}$ fatty acids conjugated to a central boron atom according to Formula I. Alternatively, Formula II provides an organoboron compound having two or more boron atoms that are connected to each other through an intervening oxygen atom. According to Formula II, the fatty acid substituent groups $R_4$ are covalently bonded to the boron atoms through an ester linkage. In one embodiment, the organoboron compound is a boroxine analog according to Formula III where X is O.

For Formulae I, II and III compounds, substituents $R_1$, $R_2$, $R_3$, $R_4$, $R_5$, R6 and $R_7$ can each independently be fatty acid derivatives that conform to Formula IV, Formula V, or a $NR_8R_9$ group:

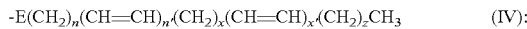

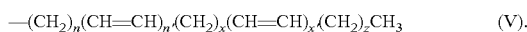

When the fatty acid is a Formula IV compound, variable "E" can be $-OC(O)-$, $-O-$, a bond, or a methylene ($-CH_2-$) groups and subscripts n, n', x, x' and z, are each independently non-negative integers. As mentioned above, depending on the numerical value of subscripts n, n', x and x' the above illustrated fatty acid derivatives can possess two or more alkene groups that are conjugated to each other. Alternatively, variations of the numerical values of subscripts n, n', x, x' and z provide a fatty acid derivative in which two alkene groups are separated from each other by one or more intervening methylene groups.

For certain fatty acids according to Formulae IV or V, subscripts n and z are integers between 0 and 16 inclusive, subscript "x" is an integer between 0 and 10 inclusive and subscripts n' and x' are integers between 0 and 2 inclusive.

Thus, in one embodiment, subscripts n and z are integers between 2-16, 3-16, 4-16, 5-16, 6-16, 7-16, 8-16, 9-16, 10-16, 11-16, 12-16, 13-16, or 14-16 inclusive. In some other embodiments "x" is 0 and subscripts n' and x' are both non-zero integers, such as 1 or 2.

In Formula I, $R_1$, $R_2$ and $R_3$ may be fatty acid derivatives according to Formula (IV), with variable "E" being a bond or a methylene group. Alternatively, Formula I also provides organoboron compounds in which any two substituent groups, namely, $R_1$, $R_2$; or $R_1$, $R_3$; or $R_2$, $R_3$ are fatty acid derivatives according to Formula IV and the remaining substituent group $R_1$, $R_2$ or $R_3$ is a $NR_8R_9$ group. For Formula I compounds having a $NR_8R_9$ group each of $R_8$ or $R_9$ can be a hydrogen, a ($C_1$-$C_{10}$) straight or branched alkyl group, an optionally substituted aryl group, such as phenyl, naphthyl, benzyl and the like optionally substituted with groups selected from halogens, amino, hydroxyls, or vinyl groups.

Examples of a $NR_8R_9$ group include without limitation N-ethyl-N-isopropylamine group, N-ethylamine group or a N-methylamine group, N-isopropylamine group, N,N-diisopropylamine group, N-ethyl-N-propylamine group or a N-methyl-N-propylamine group or a N-methyl-N-isopropylamine group. Thus, Formula I encompasses fatty acid boranes, such as N,N-dialkyl bis-9,12-octadecadienoic borane (a linoleic acid organoboron compound), and N,N-dialkyl tris-9,12, 15-octadecatrienoic borane.

Formula I also provides compounds according to one embodiment in which $R_1$, $R_2$ and $R_3$ are each independently -E(CH$_2$)$_n$(CH=CH)$_{n'}$(CH$_2$)$_x$(CH=CH)$_{x'}$(CH$_2$)$_z$CH$_3$, namely, a fatty acid derivatives according to Formula IV, with substituent "E" being a —OC(O)— (ester) or —O— group. Illustrative of such Formula I compounds are those in which any two of $R_1$, $R_2$ and $R_3$ are unsaturated fatty acids and the third substituent group is a $NR_8R_9$ group, where each of $R_8$ and $R_9$ is a hydrogen or a ($C_1$-$C_{10}$) straight or branched alkyl group.

To permit the polymerization as further described below, organoboron compounds that comport with Formula I have at least one unsaturated fatty acid attached to a boron atom. Accordingly, for organoboron compounds where each of $R_1$, $R_2$ and $R_3$ in Formula I is a fatty acid according to Formula IV: -E(CH$_2$)$_n$(CH=CH)$_{n'}$(CH$_2$)$_x$(CH=CH)$_{x'}$(CH$_2$)$_z$CH$_3$, at least one of n' and x' is an integer other than 0 (zero). In describing the fatty acid residues used in the compounds of Formula I, therefore, the sum of n+2n'+x+2x'+z is from 6 to 24, inclusive.

According to another embodiment, boron esters (borates), of unsaturated fatty acids according to Formula II are provided. For Formula II compounds, $R_4$ is an unsaturated fatty acid derivative while $R_5$ may be hydrogen, unsaturated fatty acid, alkyl, alkene, aryl or a $NR_8R_9$ group. In some embodiments, $R_4$ is a fatty acid according to Formula V. In Formula V, —(CH$_2$)$_n$(CH=CH)$_{n'}$(CH$_2$)$_x$(CH=CH)$_{x'}$—(CH$_2$)$_z$CH$_3$, subscripts n and z are integers between 0 and 16 inclusive, x is an integer between 0 and 10 inclusive, and n' and x' are integers between 0 and 2 inclusive.

Illustrative of Formula II organoborates are compounds where $R_4$ is a oleic, ricinoleic, linoleic acid, or a linolenic acid and substituent $R_5$ is a $NR_8R_9$ group, such as a N-ethyl-N-isopropylamine group or a N-methyl-N-isopropylamine group. Other organoborates within the scope of Formula II include compounds where one of $R_8$ or $R_9$ is a ($C_{1-10}$)alkyl group and the other substituent group is an optionally substituted aryl group, such as phenyl, naphthyl, benzyl and the like optionally substituted with groups selected from halogens, amino, hydroxyls, vinyl, including those described above.

According to yet another embodiment, the organoboron compound is a cyclic boroxine according to Formula III. For certain Formula III compounds variable "X" is an oxygen atom, each $R_6$ is an unsaturated fatty acid derivative that conforms to formula -E(CH$_2$)$_n$(CH=CH)$_{n'}$(CH$_2$)$_x$(CH=CH)$_{x'}$(CH$_2$)$_z$CH$_3$ (IV), or formula —(CH$_2$)$_n$(CH=CH)$_{n'}$(CH$_2$)$_x$(CH=CH)$_{x'}$(CH$_2$)$_z$CH$_3$ (V) and substituent $R_7$ is $NR_8R_9$ or a fatty acid group according to Formulae (IV) or (V). When substituent groups $R_6$ is a Formula IV group, variable "E" can be a group selected from —OC(O)—, —O—, bond, or a methylene (—CH$_2$—) group. For certain Formula III compounds having a $NR_8R_9$ as a substituent group, $R_8$ and $R_9$ can each independently be a group selected from ($C_{1-10}$)alkyl group and the other substituent group is an optionally substituted aryl group, such as phenyl, naphthyl, benzyl and the like optionally substituted with groups selected from halogens, amino, hydroxyls, or vinyl groups.

Examples of unsaturated fatty acids used in the manufacture of Formulae I, II or III organoboron compounds include those illustrated in Table 1.

TABLE 1

| Common Name | C/unsat # | Chemical name |
|---|---|---|
| Hexadectrineoid acid | 16:3 (n-3) | all-cis 7,10,13-hexadecatrienoic acid |
| Oleic acid (monounsaturated) | 18:1 (n-9) | cis-9-octadecenoic acid |
| Linoleic acid | 18:2 (n-6) | all-cis-9,12-octadecadienoic acid |
|  | 18:2 (n-6) | 10E,12Z-octadeca-9,11-dienoic acid |
| Rumenic acid | 18:2 (n-7) | 9Z,11E-octadeca-9,11-dienoic acid |
| α-linolenic acid | 18:3 (n-3) | all-cis-9,12,15-octadecatrienoic acid |
| Rumelenic acid | 18:3 (n-3) | 9E,11Z,15E-octadeca-9,11,15-trienoic acid |
| α-Eleostearic acid | 18:3 (n-5) | 9Z,11E,13E-octadeca-9,11,13-trienoic acid |
| β-Eleostearic acid | 18:3 (n-5) | 9E,11E,13E-octadeca-9,11,13-trienoic acid |
| Catalpic acid | 18:3 (n-5) | 9Z,11Z,13E-octadeca-9,11,13-trienoic acid |
| Punicic acid | 18:3 (n-5) | 9Z,11E,13Z-octadeca-9,11,13-trienoic acid |
| γ-linolenic acid | 18:3 (n-6) | all-cis-6,9,12-octadecatrienoic acid |
| α-Calendic acid | 18:3 (n-6) | 8E,10E,12Z-octadecatrienoic acid |
| β-Calendic acid | 18:3 (n-6) | 8E,10E,12E-octadecatrienoic acid |
| Jacaric acid | 18:3 (n-6) | 8E,10Z,12E-octadecatrienoic acid |
| Pinolenic acid | 18:3 (n-6) | (5Z,9Z,12Z)-octadeca-5,9,12-trienoic acid |
| Stearidonic acid | 18:4 (n-3) | all-cis-6,9,12,15,-octadecatetraenoic acid |
| α-Parinaric acid | 18:4 (n-3) | 9E,11Z,13Z,15E-octadeca-9,11,13,15-trienoic acid |
| β-Parinaric acid | 18:4 (n-3) | all trans-octadeca-9,11,13,15-trienoic acid |
| Eicosenoic acid (monounsaturated) | 20:1 (n-9) | cis-11-eicosenoic acid |
| Eicosadienoic acid | 20:2 (n-6) | all-cis-11,14-eicosadienoic acid |
| Eicosatrienoic acid | 20:3 (n-3) | all-cis-11,14,17-eicosatrienoic acid |
| Dihomo-γ-linolenic acid | 20:3 (n-6) | all-cis-8,11,14-eicosatrienoic acid |
| Podocarpic acid | 20:3 (n-6) | (5Z,11Z,14Z)-eicosa-5,11,14-trienoic acid |
| Mead acid (monounsaturated) | 20:3 (n-9) | all-cis-5,8,11-eicosatrienoic acid |
| Eicosatetraenoic acid | 20:4 (n-3) | all-cis-8,11,14,17-eicosatetraenoic acid |
| Arachidonic acid | 20:4 (n-6) | all-cis-5,8,11,14-eicosatetraenoic acid |
| Eicosapentaenoic acid | 20:5 (n-3) | all-cis-5,8,11,14,17-eicosapentaenoic acid |
| Bosseopentaenoic acid | 20:5 (n-6) | 5Z,8Z,10E,12E,14Z-eicosanoic acid |
| Heneicosapentaenoic acid | 21:5 (n-3) | all-cis-6,9,12,15,18-heneicosapentaenoic acid |
| Erucic acid (monounsaturated) | 22:1 (n-9) | cis-13-docosenoic acid |

TABLE 1-continued

| Common Name | C/unsat # | Chemical name |
|---|---|---|
| Docosadienoic acid | 22:2 (n-6) | all-cis-13,16-docosadienoic acid |
| Adrenic acid | 22:4 (n-6) | all-cis-7,10,13,16-docosatetraenoic acid |
| Docosapentaenoic acid | 22:5 (n-3) | all-cis-7,10,13,16,19-docosapentaenoic acid |
| Docosapentaenoic acid | 22:5 (n-6) | all-cis-4,7,10,13,16-docosapentaenoic acid |
| Docosahexaenoic acid | 22:6 (n-3) | all-cis-4,7,10,13,16,19-docosahexaenoic acid |
| Nervonic acid (monounsaturated) | 24:1 (n-9) | cis-15-tetracosenoic acid |
| Tetracosatetraenoic acid | 24:4 (n-6) | all-cis-9,12,15,18-tetracosatetraenoic acid |
| Tetracosapentaenoic acid | 24:5 (n-3) | all-cis-9,12,15,18,21-tetracosapentaenoic acid |
| Tetracosapentaenoic acid | 24:5 (n-6) | all-cis-6,9,12,15,18-tetracosapentaenoic acid |
| Tetracosahexaenoic acid | 24:6 (n-3) | all-cis-6,9,12,15,18,21-tetracosahexaenoic acid |

Thus, the present technology provides organoboron compounds having at least one carbon-carbon double bond containing fatty acids as one or more substituent groups attached of boron. These unsaturated fatty acids typically possess 6-24 carbon atoms in their tail. Table 1 exemplifies unsaturated fatty acids having 16, 18, 20, 22 and 24 carbon atoms. Also provided are organoboron compounds in which the fatty acid tail has two or more carbon-carbon double bond that are separated from each other by one or more intervening methylene groups.

The number of active methylene groups within the fatty acid chain are important, since neither polymerization of organoboron compounds nor the subsequent curing of the polymer to a resin upon application of a coating of the polymer to a ship's hull or any other surface will occur unless there are a sufficient number of active methylene units within the fatty acid's tail. The phrase "active methylene" refers to a —$CH_2$— group that is adjacent to a double bond, or a —$CH_2$— group that lies between two adjacent double bonds. Structurally, fatty acids having an active methylene group are illustrated as shown below. An example of a fatty acid that includes a —$CH_2$— group between two adjacent double bonds is linoleic acid while illustrative of a fatty acid having an active methylene group adjacent to two or more double bonds that are in conjugation to each other is eleostearic acid.

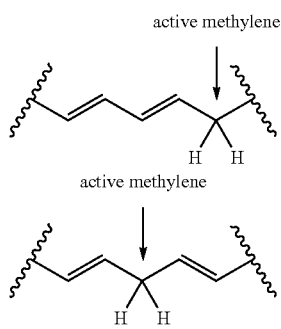

The ability of an organoboron polymer coating to dry and form a resin depends on the "drying index" of the polymer coating. The phrase "drying index" refers to the percent amount by weight of linoleic acid and linolenic acid, two important unsaturated oils contained in the drying oils, that are present in a coating having a polymer of the organoboron compound according to the present technology. The drying index is calculated using the following Formula:

Drying index=(% linoleic acid)+2 (% linolenic acid)

Generally, coatings that tend to polymerizes and cure to a solid film (resin) have a drying index value greater than 70 and are called drying alkyd resins. Exemplary drying index values of coatings that polymerize and form a solid film range from, but are not limited to those of about 70, about 75, about 80, about 85, about 90, about 92, about 94, about 95, about 96, about 97, about 98, or about 99. Drying alkyd resins manufactured using drying oils, for example, drying alkyd resins from organoboron compounds possessing unsaturated fatty acids present in safflower oil, tung oil and tall oil as the one or more substituent group of boron possess a drying index value over 70.

Table 2 illustrates the fatty acid compositional make-up of some of the commonly used drying oils obtained from plants.

TABLE 2

| | Fatty Acids | | | | |
|---|---|---|---|---|---|
| Oil | Saturated[a] | Oleic | Linoleic | Linolenic | Other |
| Linseed | 10 | 22 | 16 | 52 | |
| Safflower | 11 | 13 | 75 | 1 | |
| Soybean | 15 | 25 | 51 | 9 | |
| Sunflower, MN | 13 | 26 | 61 | trace | |
| Sunflower, TX | 11 | 51 | 38 | trace | |
| Tung | 5 | 8 | 4 | 3 | 80[b] |
| Tall Oil - A | 8 | 46 | 41[c] | 3 | 2[d] |
| Tall Oil - B | 2.5 | 51 | 43[e] | trace | 1.5[e] |
| Castor | 3 | 7 | 2 | | 87[f] |
| Coconut | 91 | 7 | 2 | | |

[a]Saturated fatty acids are mainly mixtures of stearic ($C_{18}$) and palmitic ($C_{16}$) acids; coconut oil also contains $C_8$, $C_{10}$, $C_{12}$, and $C_{14}$ saturated fatty acids;
[b]α-Eleostearic acid;
[c]Linoleic plus geometric and conjugated isomers;
[d]Rosin;
[e]Unidentified; and
[f]Ricinoleic acid.

The fatty acid organoboron compounds described above are polymerizable. Coatings of the compounds are environmentally friendly anti-fouling agents suitable for preventing corrosion and reducing the growth of biomass on the hulls of ships. Polymerization of organoboron compounds can occur upon exposure of the monomers to air, under oxidative conditions, or upon the application of heat. Without ascribing to a particular theory, it is believed that oxidative polymerization may occur due to oxygen or peroxide mediated cross-linking between olefinic groups on two distinct organoboron compounds.

Illustratively, oxygen or peroxide mediated polymerization of fatty acid based oils, such as tung oil or linseed oil, is not well understood, and likewise, the polymerization/drying action of the boron compounds herein is not well understood. However, it is believed that the polymerization through the formation of ether or peroxide linkages between olefinic groups on two distinct organoboron compounds results in a polymer network.

Polymers of organoboron compounds can have from about 2 to about 100,000 monomer units. Accordingly, the organoboron polymers can have a molecular weight in the range from about 700 to about 750, 000 daltons. Fatty acid residues that participate in polymerization generally have 6-24 carbon atoms, inclusive, and at least one active methylene group.

Polymers of organoboron compounds can be manufactured by exposing the unsaturated fatty acid organoboron compound to a radical initiator, peroxide, air or oxygen. Without being bound by theory it is believed that the polymerization of the organoboron compounds proceeds via formation of methine radicals. Briefly, it is believed that a hydrogen radical may be abstracted from an active methylene group to form a methine radical (—CH.—). A subsequent reaction between methine radicals of two independent organoboron compounds initiates polymerization through the formation of a >CH—CH< bond. Additionally, or alternatively, polymerization may occur through via a mechanism that include formation of an ether or peroxide linkage between two independent organoboron compounds. In such a scheme, a first methine radical is formed upon the removal of a hydrogen attached to an active methylene carbon. The first methane radical undergoes a radical shift to form a second methine radical on the carbon at the distal end of one of the adjacent carbon-carbon double bonds. Contact of the second methine radical with an oxygen radical or a peroxide radical followed by subsequent contact with a methine radical of an independent organoboron compound will result in an ether or peroxide-linked polymer. Further mechanisms include the formation of a diradical at a carbon-carbon double bond of a first organoboron compound followed by contact with oxygen and subsequent contact with a carbon-carbon double bond of a second organoboron compound. This scheme provides a dimer in which two separate organoboron compounds are bonded to each other through an ether linkage.

The formation of methine radicals in a coating composition of organoboron compounds may be promoted through the use of radical initiators and driers. In the present context, the term "drier" includes both primary and secondary driers and refers to compounds that aid or promote that hardening of a coating containing a drying oil or an unsaturated fatty acid organoboron compound. Examples of compounds that can be used as primary driers include without limitation metals such as cobalt, iron cerium, manganese and vanadium. Illustrative of the class secondary driers are lead, zirconium, bismuth, barium, aluminum strontium, calcium, zinc, lithium and potassium.

Scheme 1 illustrates the polymerization processes described above. Thus, scheme 1(A) pictorially depicts the polymerization process that involves a radical shift prior to the formation of oxygen or peroxide radicals. As stated above, these oxygen or peroxide radicals participate in a polymerization reaction when contacted with a second organoboron compound. Scheme 1(B) illustrates the structures of polymer products.

Scheme 1

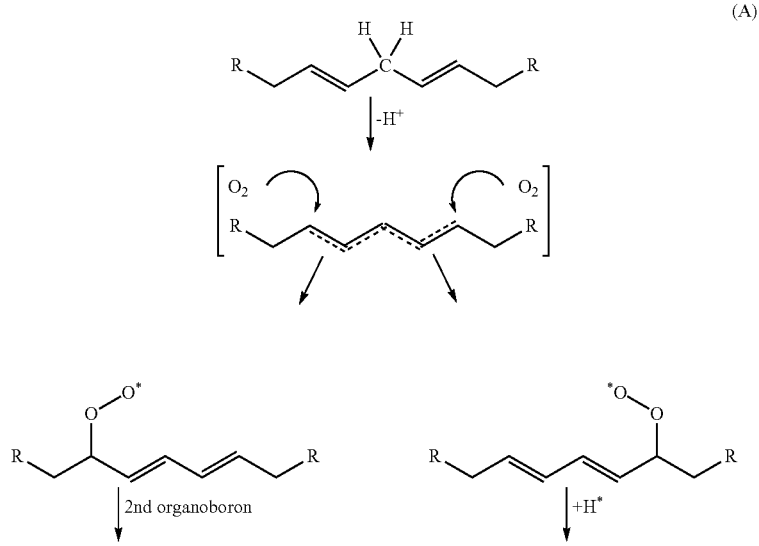

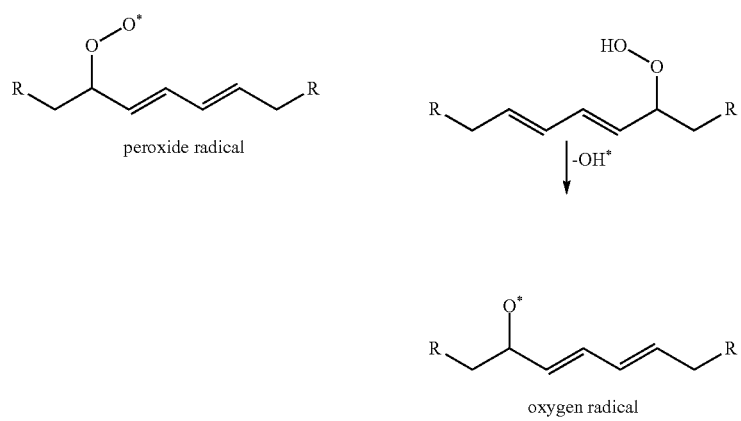

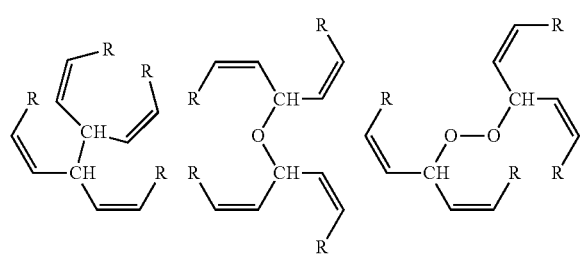

(B)

Organoboron compounds according to the present technology may also be polymerized thermally, such as through a Diels-Alder type cycloaddition reaction between two fatty acid chains on two separate organoboron monomers. Here, a carbon-carbon double bond on a fatty acid chain of a first organoboron compound undergoes a thermally catalyzed cycloaddition reaction with a carbon-carbon double bond of a fatty acid on a second organoboron compound to covalently link the first and second organoboron compounds.

Organoboron compounds described above, can be formulated as coatings appropriate for use in a wide variety of applications where antifouling coatings are used. This may include coatings for a wide variety of objects used in commercial shipping, naval applications, shipping vessel construction, railroad infrastructure, telephone poles, rebar, automotives, skyscrapers, decks, piers, airplanes, and storage tanks. The coatings or the monomeric compounds may also find use in chemical synthesis, medicinal applications, as lubricants, and pyrotechnics.

According to one embodiment, a Formula I, II or III organoboron compound can be contacted with a dispersant and a medium suitable for spraying or painting an object in need of such a coating. The organoboron compounds dispersed as monomers in the dispersing medium can be polymerized prior to the application of the coating onto the surface of an object in need of the coating. Alternatively, polymerization of the organoboron monomers may be initiated after application of the coating onto the surface of an object.

The terms "dispersants," "dispersing agents," or "dispersing medium" are being used interchangeably herein and refer to a non-surface active polymer or a surface active substance that is added to improve the separation of particles and to prevent settling or clumping of the substance to be dispersed.

Illustrative dispersing agents include without limitation ionic and non-ionic surfactants selected from Sodium lauryl sulfate, polyethylene glycol p-(1,1,3,3-tetramethylbutyl)-phenyl ether, Triton X-100, decyl octyl glycoside, steryl terminated polyethylene glycol, dodecyl terminated polyethylene glycol, alkyl polyglucoside surfactants, polysorbates (Tween™) Sodium dodecyl sulfate (sodium lauryl sulfate), lauryl dimethyl amine oxide, Cetyltrimethyl ammonium bromide (CTAB), polyethoxylated alcohols, polyoxyethylene sorbitan, octoxynol (Triton X100™), N,N-dimethyldodecylamine-N-oxide, hexadecyltrimethylammonium bromide (HTAB), polyoxyl 10 lauryl ether, Brij 721™, bile salts (sodium deoxycholate, sodium cholate), polyoxyl castor oil (Cremophor™), nonylphenol ethoxylate (Tergitol™), cyclodextrins, lecithin and methylbenzethonium chloride (Hyamine™)

Coatings of organoboron compounds according to the present technology can also contain a solvent or mixtures of solvent as a medium to facilitate the application of the coating to a surface. Depending on the chemical nature of the organoboron compound as well as the intended use of a coating containing such organoboron compounds the medium used in the manufacture of coatings can be aqueous or organic in nature. For aqueous based coating compositions, water alone or a mixtures of water and alcohol can be used as suitable solvent medium.

Alternatively, organic solvents are used as the medium for coating compositions according to the present technology. Illustrative types of organic solvents include, but are not limited to, volatile organic compounds, acyclic and cyclic ethers, alcohols, tert-butylacetate and halogenated solvents. Illustrative solvents include, but are not limited to, 1,1,1-trichloroethane, methylene chloride, 1,1,2-trichloro-1,2,2-trifluoroethane, chlorodifluoromethane, chloropentafluroethane, 1,1,-difluroethane, tetrahydrofuran, diethylether, ethylene glycol, glyme, diglyme, propylene glycol, ethanol, propanol, iso-propanol, butanol, iso-butanol, benzyl alcohol, 2-methylphenol, 3-methylphenol, 4-methylphenol, Carbitol, Cellosolve®, butyl Cellosolve, and Cellosolve acetate.

For certain applications, the coatings can optionally include color pigments. Alternatively, the coating can be combined with a paint suitable for applications listed above, including the coating of ship hulls for commercial, and naval vessels, and coating for railroad and aerospace projects. The amount of pigment added to the coating will depend on the use. For example, the amount of pigment added to a coating that includes the organoboron compound is from about 1 wt % to about 50 wt %. In some embodiments, the amount of organoboron in the coating is from about 5 wt % to about 50 wt %. In other embodiments, the amount of organoboron may be about 1 wt %, about 5 wt %, about 10 wt %, about 15 wt %, about 20 wt %, about 25 wt %, about 30 wt %, about 35 wt %, or about 40 wt %.

Both inorganic color pigments and organic color pigments can be included in the compositions of organoboron compounds according to the present technology. Examples of a few inorganic color pigments include without limitation blue, bone black, burnt sienna, burnt umber, carbon black, cerulean blue, cerulean blue deep, chromium oxide green, cadmium orange, cadmium red dark, cadmium red light, cadmium red medium, cadmium yellow dark, cadmium yellow light and cadmium yellow primrose. Illustrative organic color pigments include without limitation anthraquinone, diarylide yellow, dioxazine purple, green gold, hansa yellow light, hansa yellow medium, hansa yellow opaque and jenkins green.

The polymerizable organoboron compounds according to Formulae I, II or III are readily synthesized by contacting a trihaloborane with the desired unsaturated fatty acid or a derivative of an unsaturated fatty acid. Alternatively, a bis-halo N,N-disubstituted amino borane can be contacted with a fatty acid or fatty acid derivative under appropriate conditions to obtain the Formulae I, II and III organoboron compounds.

The present technology provides a method for the manufacture of polymerizable boron esters. According to one embodiment, the boron ester compound having a B($R_{12}$) moiety represented by Formula VI is synthesized by contacting a boron trihalide such as $BX_3$ where X is chlorine, bromine, or fluorine or a bis-halo dialkylamino borane with $ME(CH_2)_n (CH=CH)_{n'}(CH_2)_x(CH=CH)_{x'}(CH_2)_z CH_3$, a fatty acid according to Formula VII. In this structure, variable "M" is an alkali metal or an alkaline earth metal while variable "E" is —OC(O)—. Examples of alkali metals include without limitation lithium, sodium, potassium or cesium while exemplary of the alkaline earth metals are magnesium, calcium and barium. Subscripts n and z are integers between 0 and 16 inclusive, while subscripts n' and x' are integers between 0 and 2 inclusive and the subscript x is an integer between 0 and 10 inclusive. To permit polymerization, $R_{12}$ in Formula VI is an unsaturated fatty acid according to Formula VII in which at least one of subscripts n' and x' is a non-zero (0) integer and the sum of n+2n'+x+2x'+z is an integer between 6 to 24 inclusive.

Scheme 2 illustrates one method for synthesizing polymerizable boron esters (borates) having a B($R_{12}$) moiety according to Formula VI.

Synthesis of Formula I Polymerizable Boron Esters of Fatty Acids as Antifouling Agents.

Thus, the present technology provides a protocol for synthesizing a fatty acid borane, that is a Formula I compound in which, $R_1$, $R_2$ and $R_3$ are each independently fatty acid groups or any one of substituent groups $R_1$, $R_2$ or $R_3$ is a compound according to —$NR_6R_7$ with the other two substituent groups being fatty acids according to Formula IV: -E($CH_2)_n (CH=CH)_{n'}(CH_2)_x(CH=CH)_{x'}(CH_2)_z CH_3$.

As illustrated in Scheme 2, an boron ester according to Formula I was obtained by contacting a bis-alkylamino dihaloborane ($BX_2(NR_9R_{10})$; Formula VIII) with at least one Formula VII fatty acid. In Formula VIII, substituent X can be fluorine, bromine or chlorine and substituent groups $R_9$ and $R_{10}$ can each independently be hydrogen, ($C_{1-10}$)alkyl, aryl or ($C_{2-10}$)alkenylene groups.

According to one embodiment, Formula I borane are synthesized utilizing the synthetic protocol illustrated in Scheme 3.

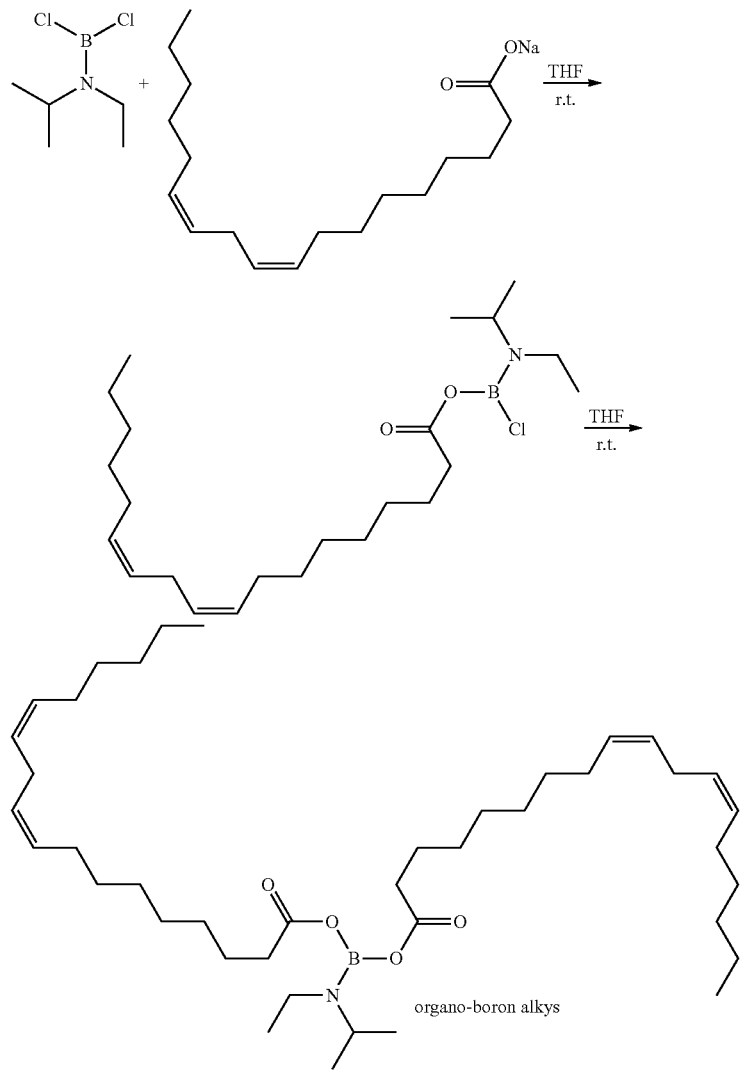

organo-boron alkys

Scheme 3

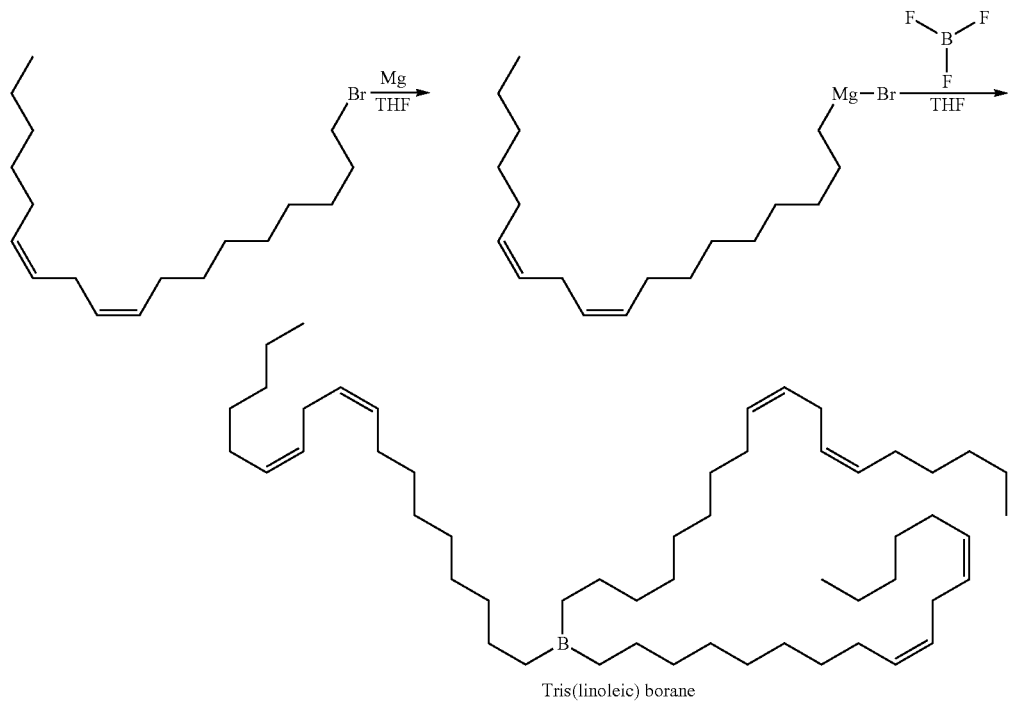

Tris(linoleic) borane

Synthesis of Mono, Bis, and Tris Fatty Acid Boranes Antifouling Compounds

The present technology also provides boron ethers of unsaturated fatty acids. Briefly, boron trihalide such as boron trifluoride or boron trichloride is contacted with a fatty alcohol HO(CH$_2$)$_n$(CH=CH)$_{n'}$(CH$_2$)$_x$(CH=CH)$_{x'}$(CH$_2$)$_z$CH$_3$ (Formula X), to provide a moiety in which the fatty acid is covalently bonded to the boron atom through an ether oxygen according to Formula IX: BR$_{13}$.

In Formula IX, R$_{13}$ is —O(CH$_2$)$_n$(CH=CH)$_{n'}$(CH$_2$)$_x$(CH=CH)$_{x'}$(CH$_2$)$_z$CH$_3$, a fatty alcohol derivative represented by Formula XI. Subscripts n, n', x, x' and z are non-negative integers in Formula XI. Thus, for fatty alcohol and fatty alcohol derivatives used in the manufacture of a Formula IX moiety, subscripts n and z are integers between 0 and 16 inclusive, subscripts n' and x' are integers between 0 and 2 inclusive and subscript "x" is an integer having a numerical value between 0 and 10 inclusive. To permit the polymerization of organoboron monomers having a Formula IX moiety it is necessary that subscripts n' and x' both are not simultaneously 0 (zero) and the sum total of subscripts n+2n'+x+2x'+z in a fatty alcohol or a fatty alcohol derivative is an integer from 6 to 26 inclusive.

In an exemplary synthetic protocol for synthesis of a compound having a Formula IX moiety boron trifluoride etherate or boron trichloride is contacted with a fatty alcohol, such a linoleic alcohol. The latter is readily obtained by reducing the fatty acid to the alcohol using borane. Alternatively, a compound having a Formula IX moiety is synthesized by contacting a amino dihaloborane (BX$_2$(NR$_9$R$_{10}$; R$_9$ and R$_{10}$ are —H), an alkylamino dihaloborane (BX$_2$(NHR$_{10}$; R$_{10}$ is alkyl), or a bis-alkylamino dihaloborane (BX$_2$(NR$_9$R$_{10}$; R$_9$ and R$_{10}$ are alkyl) with a fatty alcohol. Scheme 4 illustrates the protocol for synthesizing boron ether having a Formula IX moiety.

Scheme 4

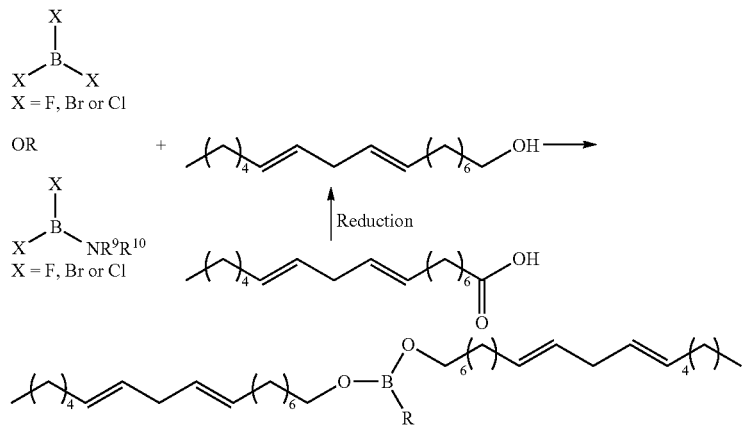

R = organic radical; e.g., NR$_6$R$_7$ or an alkyl or aryl group

In some embodiments, the present technology provides a method for making a Formula II compound. In an exemplary protocol, Formula II compounds were prepared by adding linoleic acid to a stirring solution of the desired alkyl boronic acid and heating this mixture at a temperature between 80° C. to 150° C.

The present technology also provides cyclic boroxines according to Formula III. Briefly, cyclic boroxines according to Formula III may be synthesized by dehydration of substituted boronic acid using heat, high vacuum, or in the presence of dehydrating reagents, such as anhydrous potassium carbonate, anhydrous sodium sulfate, or pyridine. In one embodiment, a boronic acid according to formula R—B(OH)$_2$, where R is an unsaturated fatty acid is dehydrated to form a cyclic boroxine according to Formula III.

EXAMPLES

Example 1

Synthesis of Polymerizable Borates of Linoleic Acid

To a stirring solution of sodium linoleate (50 g) dissolved in anhydrous tetrahydrofuran (THF; 500 ml) at room temperature was added N-ethyl-N-isopropylamino dichloroborane (14 g). The addition was conducted drop-wise to dissipate the heat of the exothermic reaction. After stirring at room temperature overnight, the reaction mixture was filtered to remove NaCl, and the filtrate concentrated to obtain N(C$_2$H$_5$)CH$_3$CHCH$_3$)B(OC(O)C$_{17}$H$_{31}$)$_2$, in near quantitative yield. $^1$H NMR (CDCl$_3$): 3.3 ppm (0.9H), 2.7 ppm (3.9H), 2.2 ppm (3.8H), 2.0 ppm (8.2H), 1.6 ppm (4.0H), 1.3 ppm (38.1H) and 0.9 ppm (6.1H); MALDI—[M=H]$^+$ 656.65.

Example 2

Synthesis of Polymerizable Boranes of Linoleic Acid

Step 1, Synthesis of linoleyl methanesulfonate. To a 500-mL, three-necked flask equipped with a mechanical stirrer, inlet and outlet tubes for purified/dry nitrogen, and a dropping funnel that is connected with the argon inlet tube, was added linoleyl alcohol (23.0 g; 86 mmoles) dissolved in pyridine (80 ml). The solution in the flask was chilled using an ice bath. Methanesulfonyl chloride (15.0 g; 130 mmol) was added dropwise over one hour. Following addition, the ice bath is removed and the reaction flask was allowed to warm to room temperature. Stirring of the reaction was continued for 5 hours at room temperature.

An almost colorless slurry that was obtained at the end of this stirring period. This slurry was dissolved by adding 150 ml. of degassed water, followed by the gradual addition of 200 milliliters of ether. The reaction mixture was cooled and stirred during the addition of ether. The entire mixture is then transferred to a 1 liter separation funnel. The yield of methanesulfonate depends greatly upon the rapidity and manner the extraction is done. Thus, after separation of the organic layer from the water layer the latter is kept in an ice bath. The ether phase was extracted consecutively with 50 ml of water, 2 N sulfuric acid to acidify the solution, 50 ml of water, 170 ml of potassium carbonate solution to neutralize the excess acid and then extracted with 50 ml of water. The obtained organic layer was dried over anhydrous sodium sulfate. The aqueous phases obtained during solvent extraction are combined and the pH of this mixture was measured. If the combined aqueous mixture is basic, a solution of 2N sulfuric acid was added to acidify the solution. The acidic aqueous solution was then extracted using ether (200 ml) and the ether layer was subsequently washed with water, followed by a 1% potassium carbonate solution and then water. After separating the ether layer, the solution was concentrated. The residue obtained from concentration of the ether layer was dissolved in 120 ml. of absolute ethanol and recrystallized at −50° C. The long needles of linoleyl methanesulfonate were collected at the same temperature using a chilled Buchner funnel. The product was transferred into a flask and dried first by an argon stream, then under vacuum, yielding 23.7 g. m.p. −5° C.

Step 2: Synthesis of linoleyl bromide. Linoleyl methanesulfonate (27 g, 78 mmoles), anhydrous magnesium bromide (43 g; 238 mmoles), and 1000 ml of dry ether was placed in a 2500 ml three-necked flask equipped with reflux condenser, inlet and outlet tubes for dry nitrogen, and mechanical stirrer. The mixture was stirred vigorously at room temperature for 24 hr. More ether, and cold, degassed water were added after 24 hours. The water layer was extracted twice with ether. The combined ether phases were washed consecutively with water, 1% potassium carbonate solution, and water, and are dried over anhydrous sodium sulfate. Concentration of the ether phase using a rotary evaporator yielded 25 g (97%) of linoleyl bromide; mp −35° C.

Step 3: Synthesis of compounds A and B, below. To a suspension of magnesium turnings (4.5 g, 187 mmol) with one crystal of iodine in 500 mL of anhydrous THF under nitrogen was added a solution of 50 g linoleyl bromide in 75 mL of anhydrous THF at room temperature. The resulting mixture was warmed to 40° C. under argon and stirred overnight. The reaction was then cooled to room temperature to obtain a mixture of linoleyl magnesium bromide.

The cloudy mixture of linoleyl magnesium bromide at room temperature and under argon is added dropwise to a solution of 4.22 g trifluoroborane (62.3 mmol) in 50 mL of anhydrous ether in a dried three neck flask purged with argon. The solution is vigorously stirred during addition and stirring is continued over a period of two hours. A white precipitate of magnesium bromide forms and coats the flask.

Following stirring, the reaction is diluted with water and the aqueous reaction mixture was extracted with ether. Concentration of the ether layer followed by column chromatography afforded two compounds. One of the isolated compounds had a mass of 838.370 g/mol that corresponds to the cyclic organoboron compound shown below as Formula (A). It is believed that contamination of the commercially available tetrahydrofuran with water results in the formation of this cyclic product.

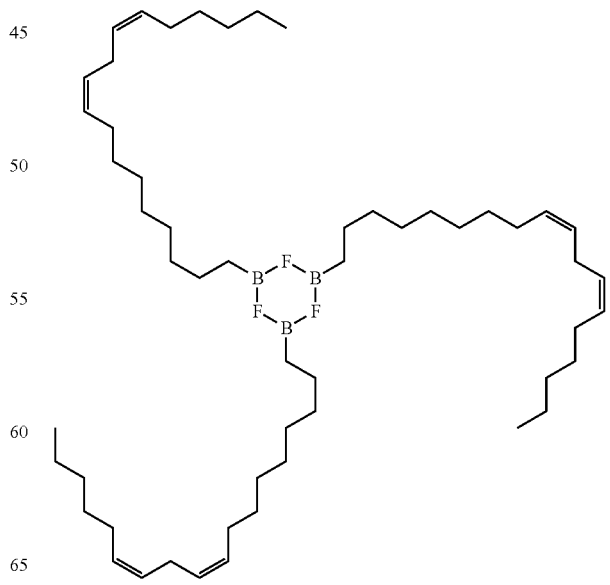

(A)

The other isolated compound had a mass of 758.710 g/mol and corresponded to a Formula I organoborane shown below as Formula (B).

(B)

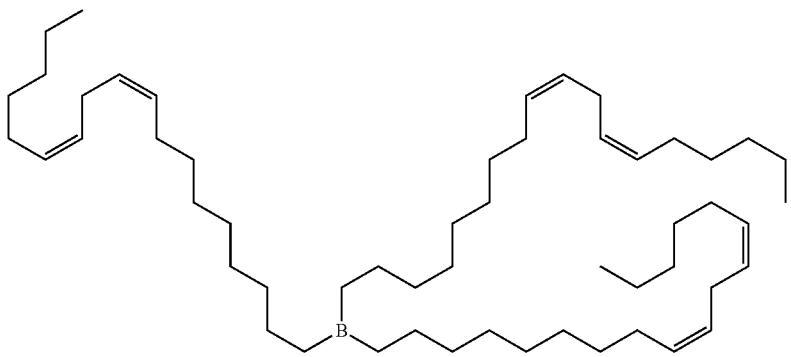

Example 3

Synthesis of Dibutyl Dilinoleicdiboronate

In an exemplary protocol, the titled compound was prepared by heating a mixture of butylboronic acid (5 gm, 49.05 mmol) and linoleic acid (79.85 gm, 147.15 mmol) at 100° C. for three hours to obtain dibutyl dilinoleicdiboronate structurally illustrated below. Yield 72%.

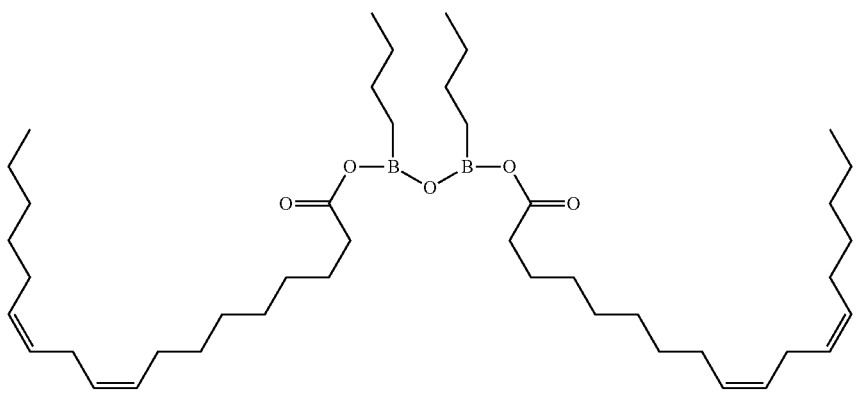 [SMILES: CCCCC/C=C\C/C=C\CCCCCCCC(=O)OB(CCCC)OB(CCCC)OC(=O)CCCCCCC/C=C\C/C=C\CCCCC]

Example 4

Synthesis of 2,4,6-tri((9Z 12Z)-octadeca-9,12-dienly)1,3,5,2,4,6-trioxaborinane The present technology also provides cyclic boroxines according to Formula III. Briefly, cyclic boroxines according to Formula III may be synthesized by dehydration of substituted boronic acid using heat, high vacuum, or in the presence of dehydrating reagents, such as anhydrous potassium carbonate, anhydrous sodium sulfate, or pyridine. In one embodiment, a boronic acid according to R—B(OH)$_2$, where R is an unsaturated fatty acid is dehydrated to form a cyclic boroxine according to Formula III.

Trimethoxyborate (4.40 g, 42.34 mmol) is dissolved in anhydrous tetrahydrofuran (THF, 50 mL), in a dried three necked flask purged with argon. The solution is cooled using a dry ice-acetone bath. To this cold solution is added a cloudy room temperature solution of linoleyl magnesium bromide under constant stirring and an inert atmosphere of argon. The resultant reaction mixture is stirred vigorously for an additional period of two hours and then warmed to room temperature. To the reaction mixture is added deoxygenated, deionized water (500 mL) and the resultant solution is subjected to rotary evaporation to remove THF. The aqueous mixture is extracted thrice with methylene chloride and the combined organic layers are dried followed by removal of the solvent by rotary evaporation to give linoleyl boronic acid.

De-hydration of a toluene solution of the obtained linoleyl boronic acid under refluxing conditions using a Deans-Stark trap and under an inert atmosphere of argon gives 2,4,6-trilinoleyl-cyclotrioxaborinane, a Formula III compound.

Alternatively, Formula III compounds can be synthesized using the procedure disclosed by Brown and Cole *Organometallics* 1985, 4, 816-821. Thus, linoleyl boronic acid (29.43 g, 100 mmol) was placed in a 100-mL round-bottom flask containing 100 mmol (4.21 g) calcium hydride and a magnetic stirring bar. The flask was fitted with a reflux condenser. The boronic acid was dissolved in 50 mL of ether and refluxed under argon for 3 h. During this time the hydrogen gas that evolved was vented out. The reaction mixture was cooled, and the clear supernatant was cannulated to a clean round bottom flask. The solid calcium compound residue was washed with ether (2×50 mL) and the ether washing were combined with the supernetant. The combined organic layers were then removed by rotoary evaporation to give a cyclotrioxaborinane as a Formula III compound.

Example 5

Anti-Fouling Compositions

The hull of a 12-foot fiberglass sailboat will be coated with a composition that includes the organoboron compound according to Formula I, II or III. The entire boat is then heated to cure and promote polymerize the composition and form a solid coating on the ship's hull. The anti-fouling properties of a hull coated with a polymer of a Formula I, II or III organoboron compound will be compared to an untreated hull and a hull coated with a copper-based antifoulant. These three ship hulls will be placed into a natural, salt water environment and the mass of the biofilm on each hull, per square centimeter, will be measured every thirty days for six months. The untreated hull is expected to accumulate more biofilm than hulls treated using a composition containing a Formula I, II or III organoboron compound or the copper-based antifoulant. Further, the color of the untreated hull is expected to exhibit more fading than the color of the treated hulls.

EQUIVALENTS

The embodiments, illustratively described herein may suitably be practiced in the absence of any element or elements, limitation or limitations, not specifically disclosed herein. Thus, for example, the terms 'comprising,' 'including,' 'containing,' etc., shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase 'consisting essentially of' will be understood to include those elements specifically recited and those additional elements that do not materially affect the basic and novel characteristics of the claimed technology. The phrase 'consisting of' excludes any element not specified.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent compositions, apparatuses, and methods within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as 'up to,' 'at least,' 'greater than,' 'less than,' and the like, include the number recited and refer to ranges which can be subsequently broken down into subranges as discussed above. Similarly, the phrase "at least about" some value such as, e.g., wt % includes at least the value and about the value. For example "at least about 1 wt %" means "at least 1 wt % or about 1 wt %." Finally, as will be understood by one skilled in the art, a range includes each individual member.

While certain embodiments have been illustrated and described, it should be understood that changes and modifications can be made therein in accordance with ordinary skill in the art without departing from the technology in its broader aspects as defined in the following claims.

What is claimed is:

1. A compound which is represented by Formula I, II or III:

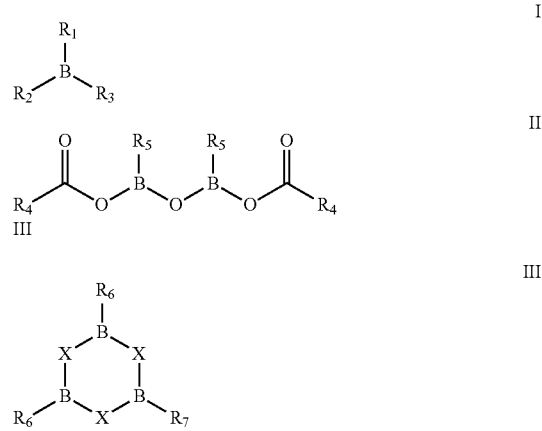

wherein:

$R_1$ and $R_2$ are independently a group represented by Formula IV:

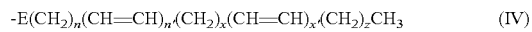

E is —OC(O)—, O, or $CH_2$;

$R_3$, each $R_5$, and $R_7$ are independently $NR_8R_9$ or a group represented by Formula IV;

$R^4$ is a group represented by Formula V:

each $R_6$ is a group represented by Formula IV or Formula V;

$R_8$ is H or alkyl;

$R_9$ is H or alkyl;

X is O;

n is from 0 to 16;

n' is 1, or 2;

x is from 0 to 10;

x' is 1, or 2;

n' and x' are both greater than 0; and z is from 0 to 16;

provided that:
the sum of (n+2n'+x+2x'+z) is from 6 to 24.

2. The compound of claim 1, wherein the sum of: n+2n'+x+2x'+z is from 14 to 24.

3. The compound of claim 1, wherein x is 0.

4. The compound of claim 1, wherein x is 1.

5. The compound of claim 1, wherein z is from 1 to 7.

6. The compound of claim 1, wherein n is from 1 to 16.

7. The compound of claim 1, wherein E is $CH_2$.

8. The compound of claim 1, wherein E is O.

9. The compound of claim 1, wherein E is —OC(O).

10. The compound of claim 1, wherein the compound is represented by Formula I, and $R_1$ and $R_2$ are the same, $R_3$ is $NR_8R_9$, $R_8$ is $C_2$-$C_4$ alkyl, and $R_9$ is $C_2$-$C_4$ alkyl.

11. The compound of claim 1 which is represented by Formula I, and $R_1$, $R_2$, and $R_3$ are the same.

12. The compound of claim 10, wherein the group represented by Formula IV comprises a carbon chain designated as 16:3 (n–3); 18:2 (n–6); 18:2 (n–6); 18:2 (n–7); 18:3 (n–3); 18:3 (n–3); 18:3 (n–5); 18:3 (n–5); 18:3 (n–5); 18:3 (n–5); 18:3 (n–6); 18:3 (n–6); 18:3 (n–6); 18:3 (n–6); 18:3 (n–6); 18:4 (n–3); 18:4 (n–3); 18:4 (n–3); 20:2 (n–6); 20:3 (n–3); 20:3 (n–6); 20:3 (n–6); 20:3 (n–9); 20:4 (n–3); 20:4 (n–6); 20:5 (n–3); 20:5 (n–6); 21:5 (n–3); 22:2 (n–6); 22:4 (n–6); 22:5 (n–3); 22:5 (n–6); 22:6 (n–3); 24:4 (n–6); 24:5 (n–3); 24:5 (n–6); or 24:6 (n–3), wherein the number before the colon is the total number of carbon atoms in the group, the number after the colon is the number of unsaturations in the group, and the number in parentheses is the carbon number from a terminal carbon at which the first unsaturation is located, with each unsaturation being separated from the next by a single methylene group.

13. A polymer comprising a polymerization product of the compound of claim 1.

14. The polymer of claim 13, wherein the polymerization product is an olefinic polymerization product, a Diels-Alder polymerization product, an oxygen cross-linked polymerization product, or a peroxide cross-linked polymerization product.

15. A coating composition comprising:
polymer of claim 13;
a dispersant; and
a medium.

16. An article comprising the coating composition of claim 15.

17. A process of preparing a compound of claim 1 having a moiety represented by Formula VI:

$$B—(R_{12}) \qquad \qquad VI$$

the process comprising:
contacting a compound represented by Formula VII with a compound having a B-halogen moiety:

$$ME(CH_2)_n(CH=CH)_{n'}(CH_2)_x(CH=CH)_{x'}(CH_2)_zCH_3 \qquad (VII):$$

wherein:
$R_{12}$ is a group represented by Formula IV:

$$-E(CH_2)_n(CH=CH)_{n'}(CH_2)_x(CH=CH)_{x'}(CH_2)_zCH_3 \qquad (IV)$$

E is —OC(O)—, O, or $CH_2$;
M is an alkali or alkaline earth metal halide;
n is from 0 to 16;
n' is 1, or 2;
x is from 0 to 10;
x' is 1, or 2;
n' and x' are both greater than 0; and
z is from 0 to 16;
provided that:
the sum of:
n+2n'+x+2x'+z is from 6 to 24.

18. The process of claim 17, wherein M is Li, Na, K, MgF, MgBr, or MgCl.

19. A process of preparing a compound of claim 1 having a moiety represented by Formula IX:

$$B—(R_{13}) \qquad \qquad IX$$

the process comprising:
contacting a compound represented by Formula X with a compound having a B-halogen moiety:

$$HO(CH_2)_n(CH=CH)_{n'}(CH_2)_x(CH=CH)_{x'}(CH_2)_zCH_3 \qquad (X):$$

wherein:
$R_{13}$ is a group represented by Formula XI:

$$—O(CH_2)_n(CH=CH)_{n'}(CH_2)_x(CH=CH)_{x'}(CH_2)_zCH_3 \qquad (XI)$$

n is from 0 to 16;
n' is 1, or 2;
x is from 0 to 10;
x' is 1, or 2;
n' and x' are both greater than 0; and
z is from 0 to 16;
provided that:
the sum of:
n+2n'+x+2x'+z is from 6 to 24.

* * * * *